March 7, 1967 — J. H. ENGLEMAN — 3,307,513
MULTIPLE COMPARTMENT SCOW
Filed Oct. 20, 1965

INVENTOR.
JOSEPH H. ENGLEMAN
BY
*Fred C. Matheny*
ATTORNEY.

United States Patent Office 3,307,513
Patented Mar. 7, 1967

3,307,513
MULTIPLE COMPARTMENT SCOW
Joseph H. Engleman, P.O. Box 555,
Seattle, Wash. 98111
Filed Oct. 20, 1965, Ser. No. 498,533
6 Claims. (Cl. 114—74)

My invention relates to a multiple compartment scow or barge for transporting liquid and bulk cargo and which is hereinafter referred to as a scow.

A general object of my invention is to provide an all metal scow of improved construction and design which is not expensive to build and can be used efficiently and economically in handling cargo especially in harbors, on rivers and in like waters.

Box type scows or barges of the type now in common use are heavy and expensive to construct because they require much internal bracing and trussing to withstand external water pressure on their long flat sides and bottoms and for the support of deck loads. Also because of their broad flat shape the forward ends of these conventional scows offer high resistance to movement through the water and the flat sides and bottoms and rearward ends are subject to heavy drag and create a substantial amount of water turbulence in their wake.

In accordance with my invention I do away with flat underwater surfaces and in so doing eliminate the need for internal supports, trusses and bracing, minimize water resistance and provide a construction in which turbulence to the rear of the scow is greatly reduced.

An object of my invention is to provide a scow which is sectionalized or made up of a plurality of independent compartments each sealed from all of the others so that in case of accident there will usually be enough compartments left undamaged to keep the scow seaworthy and afloat.

Another object of my invention is to provide a scow in which the buoyant portion is composed of a plurality of side by side parallel tubular metal cargo cylinders which are disposed with their axes in a common plane and are securely welded together by inserting between adjacent cylinders longitudinally spaced apart connector members, such as pieces of I-beam, and welding the corner portions of the connector members to the walls of the cargo cylinders so that narrow water circulation openings are left between the cylinders.

Another object is to provide a scow comprising a plurality of side by side parallel connected together cargo cylinders each of which terminates at both ends in an upwardly inclined convergent end part which is conducive to smooth operation of the scow in the water, which minimizes resistance against the forward end of the scow when it is in motion and which minimizes water drag and water turbulence.

Another object is to provide a multiple compartment scow formed of side by side rigidly secured together cargo cylinders each terminating at each end in an upwardly inclined convergent end part, the convergent end parts at each end of the scow having thereon a transverse service platform, each service platform being clear of all cargo space on the scow and having readily accessible hatch tubes leading down into the cargo compartments and further having pumps, generators and other servicing equipment mounted on it.

Other objects of the invention will be apparent from the following description and accompanying drawings.

In the drawings FIGURE 1 is a top plan view, with parts of a deck and deck supporting beams broken away, showing my scow.

Like reference numerals refer to like parts throughout the several views.

Figure 1:
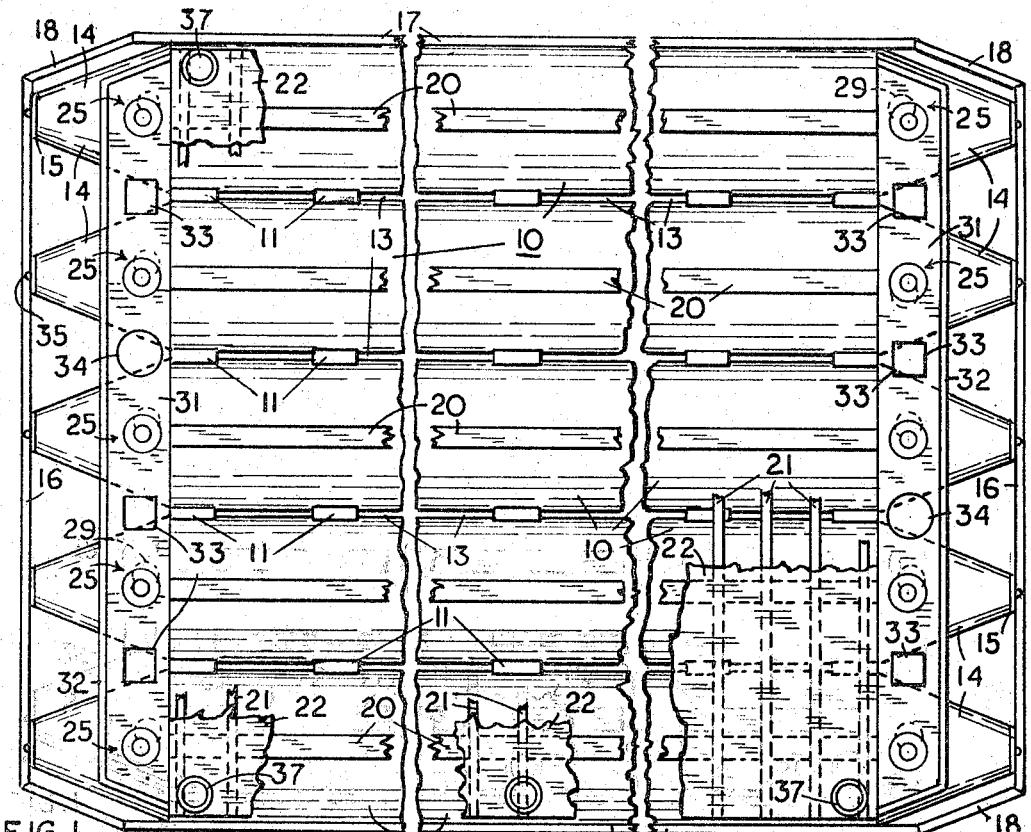
Figure 2:
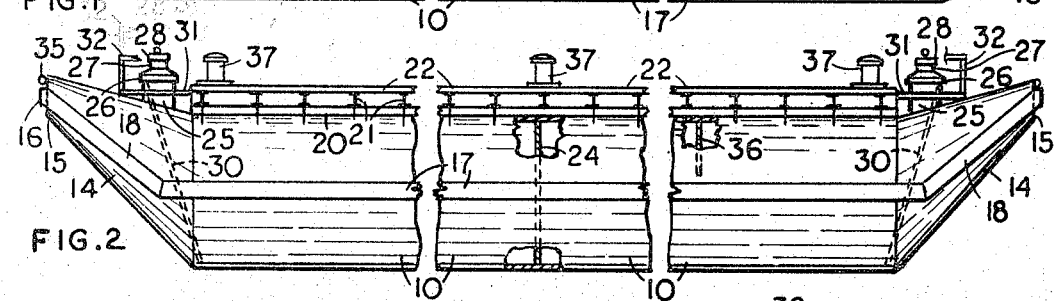
FIG. 2 is a side elevation of said scow, with parts broken away and parts shown in section.
Figure 3:
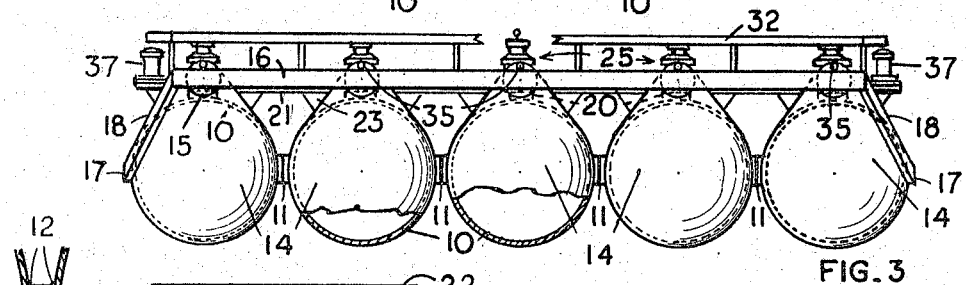
FIG. 3 is an end view of said scow, with parts broken away.

My scow comprises a plurality of side by side parallel tubular water tight steel cargo cylinders 10 of relatively large diameter, each providing one or more independent cargo compartments. Five of these cargo cylinders are herein shown for purpose of illustration but it will be understood that their number may be varied. The adjacent cargo cylinders are not in peripheral contact with each other but are spaced a short distance apart by connector members 11 in the form of sections or pieces of I-beam which are disposed in spaced apart relation between adjacent cylinders 10 and have the tips of their end flanges secured by welds 12, FIG. 4, to the sides of said cylinders 10. The sections 11 of I-beam, being spaced apart longitudinally, provide narrow slots 13 between adjacent cargo cylinders 10 through which water may pass to equalize external water pressure around all of the cylinders 10 at all times. Each section 11 of I-beam thus has a welded connection with the cylinders 10 at two locations which are spaced apart the depth of the I-beam.

Each cargo cylinder 10 is provided at each end with an upwardly inclined convergent end part 14 which has its larger inner end welded to the cargo cylinder 10 and which preferably terminates in a flat truncated outer end 15 of relatively small diameter. The convergent end parts 14 afford useful cargo space and they provide better and smoother action in the water by minimizing direct resistance to forward movement in the water and minimizing both drag and turbulence at the aft or trailing end of the scow.

A railing, formed preferably of channel bars with their side flanges directed inwardly, extends entirely around the scow. This railing comprises two similar transverse end bars 16, two similar longitudinal side bars 17 and four similar diagonal corner bars 18. The two end bars 16 extend across the smaller flat ends 15 of the end parts at the two ends of the scow and have the tips of their side flanges welded to said ends 15. The two side bars 17 extend along the sides of the two outermost cargo cylinders 10 respectively and have the tips of their side flanges welded to said cargo cylinders 10. The four diagonal corner bars 18 extend between and are respectively welded to adjacent ends of the end bars 16 and side bars 17 at the four corners of the scow. Said diagonal corner bars 18 are spaced from the convergent end parts 14, as shown in FIG. 1.

A deck supporting channel bar 20 having its side flanges directed downwardly is positioned on the top of and extends longitudinally along each cargo cylinder 10 from end to end of the cylinder. Each channel bar 20 has the tips of its side flanges welded to the cargo cylinder 10 on which it is disposed. The deck supporting channel bars 20 reinforce the cargo cylinders 10 and serve as supports for transverse I-beams 21 upon which a deck 22 or any other desired superstructure can be mounted. The I-beams 21 are welded to the channels 20 and they cooperate in securing all of the cargo cylinders together in assembled relation. Preferably gusset plates 23, see FIG. 5, of generally triangular shape, are welded between the I-beams 21 and the cargo cylinders 10 to reinforce and strengthen the I-beams 21 and make the entire structure more rigid.

In the scow herein disclosed each cargo cylinder 10 is divided into two separate compartments by a vertical partition or bulkhead 24. Obviously this partition 24 can be omitted or more than one partition 24 can be provided in each cargo cylinder. Also baffle plates, such as plate 36, can be provided in cargo cylinders used for transporting liquid to retard the flow of liquid lengthwise in the cylinders.

Figures 4, 5, 6:
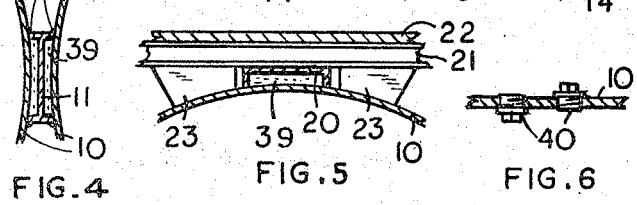
FIG. 4 is a fragmentary sectional view, on a larger scale than FIGS. 1, 2 and 3, showing means used in attaching cargo cylinders together.
FIG. 5 is a fragmentary sectional view, showing deck supporting means which also cooperates in securing the cargo cylinders together.
FIG. 6 is a fragmentary sectional view showing drain plug means.

Each convergent part 14 of each cargo cylinder is provided, on its top side, with an upwardly extending hatch tube 25, preferably about thirty inches in diameter, through which cargo can be loaded and unloaded and which serves as a manhole type entrance and exit. Each hatch tube 25 has a readily removable water tight cover 26 and preferably each cover 26 is provided with a filler pipe 27 having a removable cap 28 on it. A chain 29 secured to each cap 28 prevents it from becoming lost. A ladder 30 extends from each hatch tube 25 down into the adjacent cargo cylinder. A service platform 31 is carried by and extends across the tapered parts 14 at each end of the scow approximately from side to side of the scow. Each service platform 31 is outwardly from and clear of the cargo carrying deck 22 of the scow. A suitable hand rail 32 is provided along the outer side and across both ends of each service platform. The hatch tubes 25 extend upwardly through this service platform 31 and are conveniently accessible from said platform. Also, shown diagrammatically in FIG. 1 on each service platform 31, are pumps 33 for servicing the cargo cylinders 10 and at least one electric generator 34 to furnish electric current for use on the scow. The pumps 33 can also be used to vary the amount of liquid in the various cargo cylinders for the purpose of varying the tilt or trim of the scow. This can include imparting enough sidewise tilt to the scow to discharge cargo from the deck 22. A signal lamp 35 is carried by the end terminal part 15 of each cargo cylinder for warning purposes and suitable tie posts 37 are provided along the respective sides of the deck 22 for tieup purposes. Preferably the spaces between the I-beams 11 and channel members 17 and 20 and the parts to which they are welded are filled with a material 39, such as asphalt, see FIGS. 4 and 5, which is highly resistant to rust and corrosion. Preferably at least one pair of duplicate removable plugs 40, FIG. 6, are provided in suitable openings in the lowermost portion of each cargo cylinder compartment. One plug 40 of each set is removable from the interior and the other from the exterior of the compartment for the purpose of draining out liquid or admitting water to the compartment.

In our drawings and description we have disclosed only round or cylindrical cargo cylinders or floating containers. Any enclosed shape may be used, as elliptical or oblong or any rectangular or flat top shape.

My scow is of strong, all metal, welded construction. All joints are fully waterproof. All compartments in the cargo cylinders are fully sealed off from each other making it highly resistant to sinking in case of accident. Shifting of cargo is reduced to a minimum by the large number of compartments and the trim of the scow is easily controlled by regulating the amount of cargo in the several compartments. The cargo cylinders are well adapted for receiving liquid cargo, such as oil, or bulk cargo, such as grain, and other cargo, not suitable to be stored in the cargo cylinders, can be carried on the deck or superstructure The foregoing description and accompanying drawings clearly discloses a preferred embodiment of my invention but it will be understood that changes may be made within the scope of the following claims

I claim:

1. A scow comprising a plurality of side by side parallel tubular water tight cargo cylinders positioned with their axes in a common plane and with their adjacent peripheral portions slightly spaced apart; a plurality of relatively short longitudinally extending sections of I-beam interposed between the slightly spaced apart adjacent peripheral portions of each two adjacent cylinders, said I-beam sections being disposed in a plane common to all of said cargo cylinders and being longitudinally spaced apart providing narrow water circulation passageways between adjacent cargo cylinders and said I-beam sections having the tips of their end flanges securely welded to the walls of the cargo cylinders above and below the common plane of the axes of all of said cylinders thereby securing all of said cylinders together and forming a buoyant hull; and transverse connector means rigid with and extending across the top portions of the assembled cylinders.

2. A scow comprising a plurality of side by side parallel tubular water tight cargo cylinders positioned with their axes in a common plane and with their adjacent external peripheral portions slightly spaced apart, each cargo cylinder terminating at each end in an upwardly inclined convergently tapered end portion; a plurality of relatively short longitudinally extending sections of I-beam disposed between the slightly spaced apart adjacent peripheral portions of each two adjacent cargo cylinders, said I-beam sections being disposed in a plane common to all of said cargo cylinders and being longitudinally spaced apart providing narrow water circulation passageways between adjacent cargo cylinders and said I-beam sections having the tips of their end flanges securely welded to the walls of the cargo cylinders above and below the plane common to the axes of all of said cylinders, thereby securing all of said cylinders together and forming a buoyant hull; an inverted channel bar extending longitudinally along the top portion of each cargo cylinder and having the tips of its side flanges resting on and securely welded to the cylinder; and spaced apart deck supporting beams supported on and rigidly secured to and extending across the inverted channel bars.

3. The apparatus as claimed in claim 2 in which an end bar extends across and is securely welded to and ties together the terminal ends of all of the upwardly inclined convergent end members at each end of the assembled cargo cylinders.

4. The apparatus as claimed in claim 2 in which an end ber extends across and is securely welded to the terminal end parts of all of the upwardly inclined convergent end members at each end of the assembled cargo cylinders, and in which a longitudinally extending side bar is welded to the outermost side of each of the two outermost cargo cylinders midway between the uppermost and lowermost portions of the cylinders, and in which a diagonal corner bar is welded between the adjacent ends of the end bars and the side bars at each corner of the assembled cylinders, said end bars and side bars and diagonal corner bars forming a reinforcing and protective railing extending entirely around the assembled cargo cylinders.

5. The apparatus as claimed in claim 4 in which a service platform extends across all of the upwardly inclined convergent end members at each end of the assembled cargo cylinders; and in which a hatch tube is connected with each upwardly inclined convergent end member and extends upwardly through the adjacent service platform.

6. The apparatus as claimed in claim 4 in which a service platform extends across all of the upwardly inclined convergent end members at each end of the assembled cargo cylinders; and in which a hatch tube is connected with each upwardly inclined convergent end member and extends upwardly through the adjacent service platform and a ladder is provided in each hatch tube and extends downwardly into the cargo cylinder with which the hatch tube is connected.

References Cited by the Applicant
UNITED STATES PATENTS

| | | |
|---|---|---|
| 995,557 | 6/1911 | Peebles. |
| 2,720,181 | 10/1955 | Brandon. |
| 2,724,357 | 11/1955 | Brandon. |
| 2,725,027 | 11/1955 | Brandon. |
| 3,083,669 | 4/1963 | Bunn et al. |

MILTON BUCHLER, *Primary Examiner.*

T. M. BLIX, *Assistant Examiner.*